United States Patent [19]

Barbini et al.

[11] 4,375,755
[45] Mar. 8, 1983

[54] SNOW HORNS

[76] Inventors: Richard J. Barbini, 55 Hudson St., Dover, N.J. 07801; Matthew C. DeCicco, 425 Park Ave., Berkeley Heights, N.J. 07922

[21] Appl. No.: 295,282

[22] Filed: Aug. 24, 1981

[51] Int. Cl.³ .............................................. F25D 13/00
[52] U.S. Cl. ...................................... 62/330; 62/380; 62/384
[58] Field of Search ................. 62/309, 380, 381, 384, 62/63, 330

[56] References Cited

U.S. PATENT DOCUMENTS

| | | | |
|---|---|---|---|
| 2,703,224 | 3/1955 | Robinson | 165/90 |
| 2,893,216 | 7/1959 | Seefeldt et al. | 62/384 |
| 3,063,258 | 11/1962 | Szachnitowski | 62/309 |
| 3,214,928 | 11/1965 | Oberdorfer | 62/384 |
| 3,435,632 | 4/1969 | Fallin | 62/380 |
| 3,807,187 | 4/1974 | Vorel | 62/384 |
| 3,932,155 | 1/1976 | Pietrucha et al. | 62/63 |
| 4,166,364 | 9/1979 | Ruprecht et al. | 62/384 |

Primary Examiner—Ronald C. Capossela
Attorney, Agent, or Firm—David L. Rae; Larry R. Cassett

[57] ABSTRACT

A device for dispensing carbon dioxide snow in the form of a ribbon includes a conduit into which liquid $CO_2$ is expanded to form solid and gaseous carbon dioxide which in turn is directed as a stream into a curved horn section of increasing, rectangular cross sectional area. The gaseous and solid $CO_2$ stream is deflected to the outer curved portion of the horn section and ambient atmosphere is introduced therein to create a pressure differential that causes solid $CO_2$ to be spread evenly along the outer curved section. Solid carbon dioxide is discharged from the outlet of the horn section onto a moving surface in the form of a ribbon having a width approximately equal to the width of the horn section and at a uniform depth. Ribbons of such solid carbon dioxide may be formed on conveyor belts of freezing tunnels to enable refrigeration to be applied to the underside of items placed on such ribbons of $CO_2$ snow.

7 Claims, 5 Drawing Figures

FIG. 1
FIG. 1A
FIG. 2
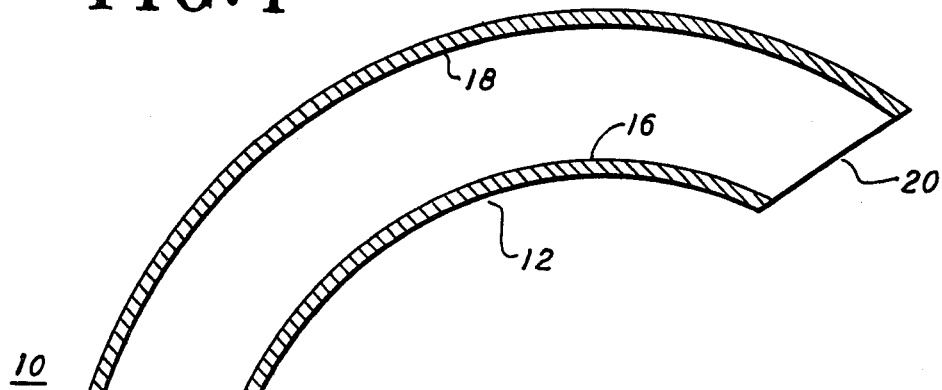
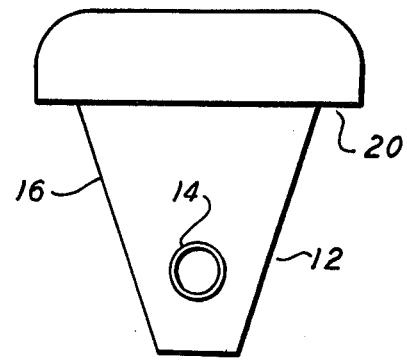
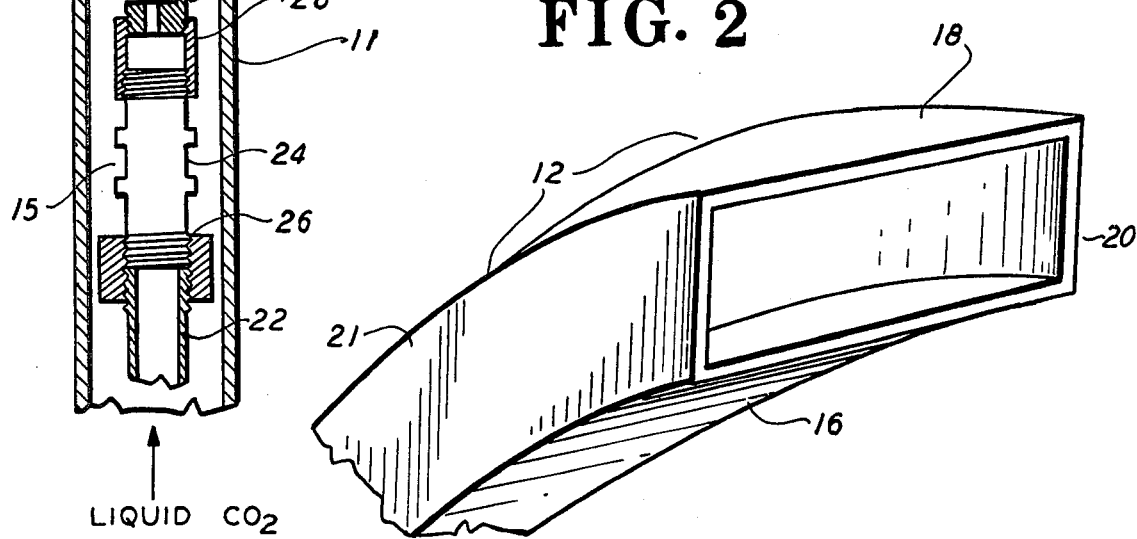

SNOW HORNS

BACKGROUND OF THE INVENTION

The present invention relates to methods and apparatus for dispensing a fluid and more particularly to methods and apparatus for depositing solid carbon dioxide in a predetermined pattern.

Carbon dioxide has been used for many years as a refrigerant for items of food and other material. Typically, liquid carbon dioxide is maintained under a pressure above the triple point pressure (60 psig) and is released through a nozzle to atmospheric pressure which results in a conversion of liquid carbon dioxide to the solid and gaseous phases. This phase conversion results in a reduction in the temperature of carbon dioxide to approximately $-109°$ F. Typically, liquid $CO_2$ is used to supply the refrigeration necessary to either freeze or chill items such as food or the like in tunnel freezers, spiral belt freezers, tumblers, blenders, etc. It is common practice to simply discharge liquid $CO_2$ through a nozzle into one of the aforementioned refrigerating devices to reduce the temperature therein and products passed therethrough to predetermined values. The use of nozzles, however, results in a point source discharge of a spray of solid and gaseous carbon dioxide and consequently, the resulting flow of particles of solid $CO_2$, i.e. snow, is not readily controllable. In many installations, liquid $CO_2$ may be injected into a freezing tunnel and simply blown by fans to sublime solid $CO_2$ which in turn chills the internal atmosphere of the freezing or refrigerating device. A typical device is illustrated in U.S. Pat. No. 3,708,995 which, as mentioned above, operates to simply move $CO_2$ about the interior of the freezing tunnel.

Another technique for depositing carbon dioxide snow on products to be refrigerated is illustrated in U.S. Pat. No. 3,757,367. In the devices illustrated in these references, liquid $CO_2$ is discharged through a nozzle into a J-tube configuration wherein a stream of solid and gaseous $CO_2$ is directed downwardly and then caused to flow upwardly toward an outlet of the tube. Prior to reaching the outlet, a separator blade or other sharp protruberance is utilized to separate the solid and gaseous $CO_2$ such that the separated solid $CO_2$ is removed from the tube and is caused to fall downwardly in a random fashion onto product being refrigerated. U.S. Pat. No. 4,111,671 discloses a similar device utilizing a separator blade although the solid-gaseous carbon dioxide stream is not supplied to an upwardly extending portion of the conduit into which liquid $CO_2$ is supplied. It has been found that the devices illustrated in these references rely on the flow of solid $CO_2$ through a relatively small orifice at the point of solid-gas separation. Consequently, solid $CO_2$ tends to agglomerate at such a point and eventually can clog the orifice which frustrates the intended purpose of this device. In order to avoid such clogging, it is known to heat the separating blade or other protruberance, although this technique requires that $CO_2$ be dispensed on an intermittent, as opposed to continuous, basis. Thus, the separation devices described in these references have not been found to be fully effective from an operational viewpoint and at best, simply dispenses solid carbon dioxide in a random fashion on a product being refrigerated and does not enable the deposition of a controlled, predetermined pattern of carbon dioxide snow on a moving surface.

U.S. Pat. No. 4,166,364 describes a technique which ostensibly ameliorates the problems of blade separation employed in J-tube solid-gas $CO_2$ separating devices. In the device described in this patent, a hood arrangement is utilized to deflect solid $CO_2$ emanating from a J-tube downwardly onto a product to be refrigerated. Although this technique may improve solid-gaseous $CO_2$ separation, the device is bulky and not readily adapted for use with tunnel freezers. Furthermore, this device does not permit the formation of ribbons of solid carbon dioxide of a substantially controlled, uniform thickness on a moving surface.

In the course of refrigerating products such as hamburger patties on a conveyor belt of a tunnel freezer, it has been found that the top side of such patties is readily frozen upon contact with the chilled ambient atmosphere in the tunnel freezer. However, the underside of such patties is not so easily refrigerated or frozen even though the patties are conveyed on a wire link belt or the like. Thus, in order to reduce the residence time of patties in the tunnel and hence reduce the consumption of $CO_2$ refrigerant required per unit weight of patties frozen, it is beneficial to deposit a layer of solid refrigerant on the belt of a tunnel freezer or other surface supporting the items being refrigerated. Upon exposure of such items to the internal atmosphere of the refrigerating device, heat is effectively removed from the items from both the top and bottom surfaces upon entry into the refrigerating device. Prior art refrigerating devices, as mentioned above, have not been adequate to so refrigerate both sides of an item and devices for depositing carbon dioxide snow onto products being refrigerated have not been effective to deposit $CO_2$ snow on conveyor belts or the like in predetermined patterns of controlled width and uniform thickness. Thus, a clear need exists in the art for a device and method for effectively depositing ribbons of solid carbon dioxide in predetermined patterns of uniform thickness.

OBJECTS OF THE INVENTION

It is an object of the present invention to provide improved methods and apparatus for dispensing liquid carbon dioxide.

It is another object of the present invention to provide improved methods and apparatus for depositing carbon dioxide snow in predetermined patterns on a moving surface.

It is still another object of the present invention to provide improved methods and apparatus for depositing carbon dioxide snow in ribbons of substantially uniform width and depth on a moving surface.

It is yet another object of the present invention to provide improved methods and apparatus for enabling refrigeration to be effectively supplied to both sides of items on a moving surface such as conveyor belts of freezing tunnels.

Other objects of the invention will become apparent from the following description of exemplary embodiments thereof which follows and the novel features will be particularly pointed out in conjunction with the claims appended thereto.

SUMMARY

In accordance with the invention, means for depositing carbon dioxide snow in predetermined patterns is comprised of a conduit communicating with a horn section having curved inner and outer portions and which is of a substantially rectangular cross section, means for emitting liquid carbon dioxide into the conduit to form a stream of $CO_2$ snow and gas which is passed into the horn section and means disposed in the horn section for inducing ambient atmosphere therein to develop a pressure gradient effective to spread solid carbon dioxide along the interior surface of the outer curved wall of the horn such that $CO_2$ snow is discharged from the horn outlet in the form of a ribbon of predetermined width and depth.

Preferably, the pressure of liquid carbon dioxide emitted into the conduit is maintained at a value of approximately 200 psig or less. Deflecting means are provided in the vicinity of the nozzle through which liquid $CO_2$ is emitted such that the stream of snow and gas is deflected to the outer curved wall of the horn section. Ambient atmosphere is induced into the horn section through an appropriate aperture and is effective to cleanse the inner curved surface of any solid carbon dioxide and spread solid $CO_2$ evenly along the interior surface of the outer curved wall of the horn section. This is achieved by a pressure gradient being established between the inner and outer curved surfaces of the horn section as a consequence of communication between the horn interior and ambient atmosphere. Thus, solid carbon dioxide is essentially separated without the use of separator blades or other protuberances in the horn section and solid $CO_2$ is caused to traverse the interior surface of the outer curved wall and is discharged from the horn section in the form of a ribbon of a width equal to the horn section width. The depth of the ribbon of solid carbon dioxide which is deposited upon discharge from the horn section will depend upon the rate at which liquid $CO_2$ is supplied to the nozzle of the device and the speed of a moving surface which receives the deposited solid carbon dioxide. Consequently, the apparatus according to the invention enables a ribbon of solid carbon dioxide to be formed in a precise pattern on a moving surface at a substantially uniform and constant depth.

It is also within the scope of the present invention to provide a plurality of snow horns adjacent to one another so as to enable a plurality of ribbons of solid carbon dioxide to be deposited on a moving surface such as the conveyor belt of a freezing tunnel or the interior wall of a refrigerating tumbler. In the event a plurality of snow horn devices according to the invention are utilized, liquid $CO_2$ may be supplied to such devices through a common manifold arrangement.

BRIEF DESCRIPTION OF THE DRAWING

The invention will be more clearly understood by reference to the following description of exemplary embodiments thereof in conjunction with the following drawing in which:

FIG. 1 is a diagrammatic view of the snow horn apparatus according to the invention while FIG. 1-A is an elevational view of the horn section; and FIG. 2 is a diagrammatic view of the outlet of a horn section of the device according to the invention.

DESCRIPTION OF PREFERRED EMBODIMENTS

Figure 3:
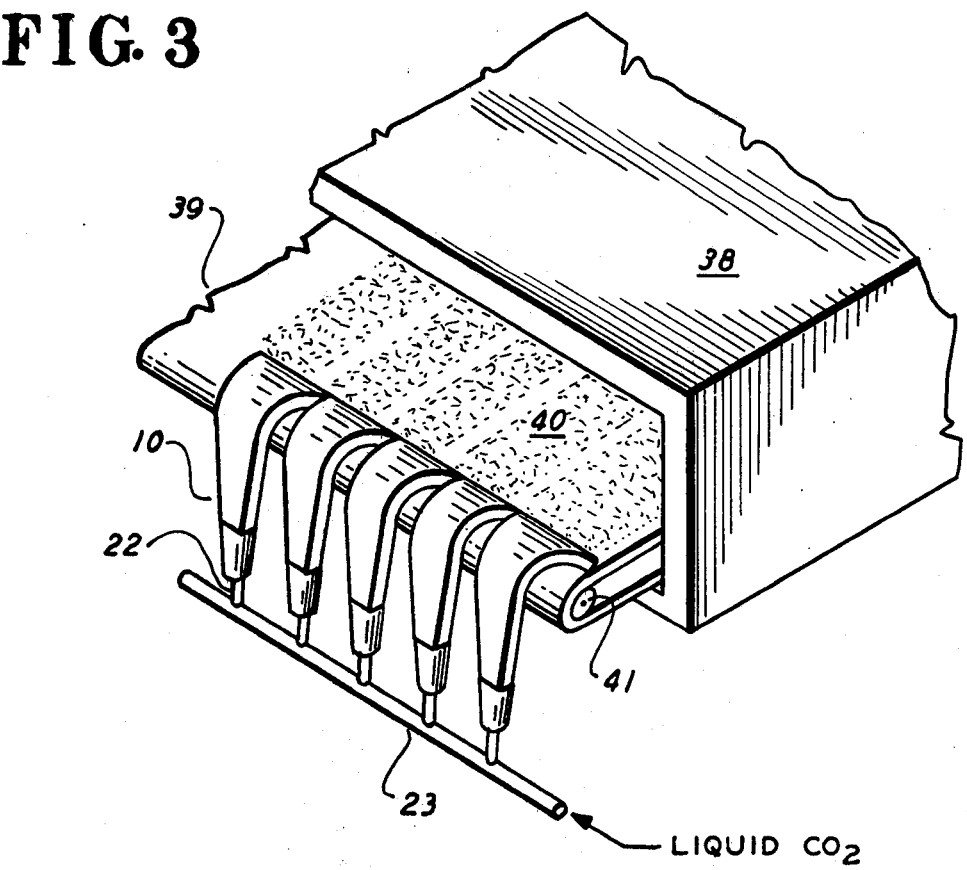
FIG. 3 is a partial isometric view of a plurality of snow horn devices according to the invention disposed in proximity to the inlet of a freezing tunnel.

In the course of the following description of the method and apparatus according to the invention, reference will be made to certain terms which will now be defined. The term "ambient atmosphere" will be understood to mean an atmosphere comprised essentially of air and carbon dioxide. As the snow horn device according to the invention is readily adaptable for use in connection with freezing tunnels or other refrigerating systems, the ambient atmosphere surrounding the snow horn devices will typically be enriched in carbon dioxide with respect to normal ambient air due to the discharge of gaseous $CO_2$ from the snow horn device along with the sublimation of $CO_2$ snow. Reference will be made to a "freezing tunnel" which as those skilled in the art will appreciate, is essentially a system wherein products to be frozen are translated through a tunnel-like enclosure typically on a conveyor belt. However, the snow horn device according to the invention can be utilized in conjunction with other refrigerating systems and the term "freezing tunnel" will be equally applicable to tumblers, spiral belt freezers and other known refrigeration systems. The term "moving surface" refers to surfaces such as conveyor belts, etc. which are translated relative to the snow horn device although such devices could be caused to move relative to a given surface.

Referring now to FIG. 1, illustrated therein is an exemplary embodiment of snow horn device 10 according to the invention. This device includes a conduit 11 in which is disposed converting means 15 for emitting liquid carbon dioxide through a nozzle 30 and a horn section 12 disposed in communication with conduit 11. A suitable conduit 14 or other means for defining an aperture in horn section 12 is provided such that the interior thereof is placed in communication with ambient atmosphere. Horn section 12 is essentially comprised of inner and outer curved walls 16 and 18 and rectangular side portions such as wall 21 shown in FIG. 2. Thus, the cross sectional area of horn section 12 is essentially rectangular and increases in the direction from the lower portion toward outlet 20.

Disposed in conduit 11 are converting means 15 for converting a flow of liquid carbon dioxide to a stream of solid and gaseous $CO_2$. Converting means 15 include a first conduit 22 which is adapted to receive a flow of liquid carbon dioxide and which is coupled to a relief valve 24 by means of a suitable threaded coupling 26. Relief valve 24 is effective to decrease the pressure of liquid carbon dioxide supplied thereto, typically at 300 psig, to a pressure in the range of about 180–200 psig. The extent of pressure reduction is adjustable and relief valve 24 may take the form of a valve commercially available from the Nupro Company, Willoughby, Ohio under Model No. 4 CPA. Relief valve 24 is connected by a suitable coupling such as threaded coupling 28 to a nozzle element 30 which is provided with a lip portion 32. Liquid $CO_2$ which is supplied through nozzle 30 will, upon leaving this nozzle, be converted to solid and gaseous $CO_2$ as the exit end of nozzle 30 is at substantially atmospheric pressure. This stream of solid and gaseous $CO_2$ will be deflected by lip 32 as it travels upwardly in conduit 11 toward the left side thereof and along the interior wall of the outer curved wall 18 of horn section 12. The flow of solid and gaseous $CO_2$ in horn section 12 will develop centrifugal forces which cause the solid $CO_2$ to traverse a path essentially along the interior surface of wall 18 of horn section 12 as this stream flows toward outlet 20. This flow will develop a pressure gradient between walls 18 and 16 which is effective to induce ambient atmosphere through conduit 14 into horn section 12. This induced flow of ambient atmosphere is effective to cleanse the interior surface of wall 16 of any solid $CO_2$ to preclude the agglomeration of $CO_2$ snow which could eventually clog or block horn section 12 and is effective to spread solid $CO_2$ evenly along the interior surface of outer wall 18. As the solid $CO_2$ traversing the interior surface of wall 18 reaches outlet 20, solid $CO_2$ drops therefrom preferably onto a moving surface such as the conveyor belt of a freezing tunnel as illustrated in FIG. 3. The geometry of this flow of solid $CO_2$ is essentially a ribbon of $CO_2$ snow having a width equal to the width of outlet 20 illustrated in FIG. 2.

Referring now to FIG. 1-A, it will be understood that the cross sectional area of horn section 12 increases in the direction of $CO_2$ flow toward the outlet 20. The mass flux of $CO_2$ which is the lbs/minute/area at different points along the path traversed by the solid and gaseous $CO_2$ stream through horn section 12 will decrease as the cross sectional area increases in the direction of $CO_2$ flow. It has been found that there is a limit to the maximum mass flux of carbon dioxide at the outlet 20 at which a ribbon of solid $CO_2$ can be deposited on a surface. It has also been found that in order to retain the $CO_2$ flow through device 10 at a mass flux level which enables such a ribbon to be deposited, it is necessary to reduce the velocity of the solid-gaseous $CO_2$ stream emanating from nozzle 30 of converting means 15. Consequently, by reducing the pressure of liquid $CO_2$ supplied to converting means 15 to a pressure of approximately 200 psig or less, and preferably between 180-200 psig, the aforementioned flow of solid and gaseous $CO_2$ will be such as to enable a ribbon of snow to be deposited on a moving surface disposed in proximity to outlet 20 of horn section 12. Alternately, the pressure of liquid $CO_2$ could be limited to the aforementioned range by suitable means disposed upstream of nozzle 30.

By providing means such as conduit 14 for enabling communication between the interior of horn section 12 and ambient atmosphere, the aforementioned pressure gradients will be established which facilitate a flow of solid $CO_2$ along the interior surface of wall 18 while removing any solid $CO_2$ which may attach to the interior surface of wall 16. Consequently, the features of (1) providing a substantially rectangular and increasing cross sectional area of horn section 12 in the direction of the $CO_2$ flow therethrough, (2) the reduction of pressure of liquid $CO_2$ to a value below approximately 200 psig, and (3) the induction of ambient atmosphere interiorly of horn section 12 all cooperate so as to enable a flow of solid $CO_2$ to form on a moving surface in proximity to outlet 20 in the form of a defined ribbon at a substantially uniform depth. It has been found that in the event liquid $CO_2$ is discharged from a nozzle in conduit 11 at a pressure of, for example, 300 psig or greater, the stream of solid $CO_2$ exiting from outlet 20 will simply not form as a ribbon on a moving surface and consequently, the desired formation of a ribbon of $CO_2$ snow at substantially uniform depth will be precluded.

Referring now to FIG. 3, illustrated therein is an exemplary embodiment of a plurality of snow horn devices 10 according to the invention disposed in proximity to the inlet end of a freezing tunnel 38. A conveyor 39, which may be driven by a conventional drive means such as roller 41, is disposed so as to receive a plurality of ribbons of solid $CO_2$ 40 deposited thereon. Liquid $CO_2$ is supplied through a manifold 23 and a plurality of conduits 22 to each of snow horn devices 10. Upon initiating a flow of liquid $CO_2$ to these devices, and translating conveyor belt 39, a plurality of ribbons of solid $CO_2$ of substantially uniform depth will be formed on conveyor 39. Items to be refrigerated, such as hamburger patties to be frozen, will, upon placement on ribbons 40, be refrigerated from underneath in addition to being refrigerated from the internal atmosphere of freezing tunnel 38.

Figure 4:
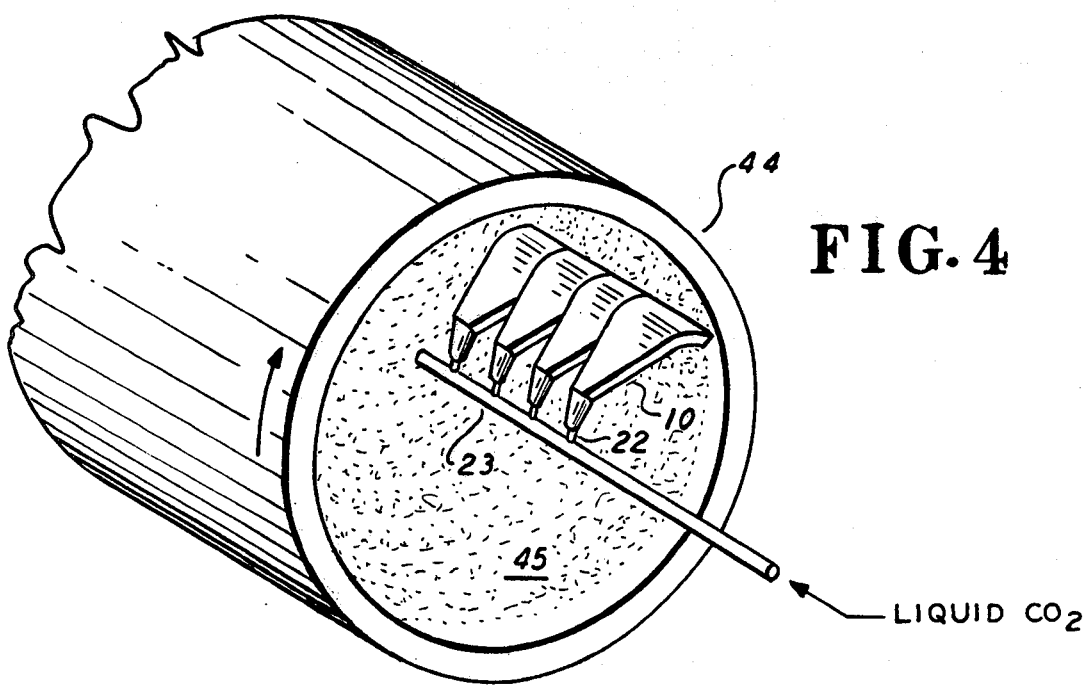
FIG. 4 is a partial isometric view of a plurality of snow horn devices according to the invention utilized with a refrigerating tumbler.

Referring to FIG. 4, there is illustrated a refrigerating tumbler device 44 which may rotate in the direction of the arrow shown thereon and which is effective in known manner to refrigerate products introduced into one end of the tumbler and which traverse the length thereof as a refrigerant is supplied to the tumbler interior. Upon introducing liquid $CO_2$ into manifold 30 and through each of conduits 22, a plurality of ribbons of 45 of solid $CO_2$ will be deposited by snow horn devices 10 on the interior wall of tumbler 45. Consequently, it will be appreciated that the snow horn devices 10 illustrated in FIG. 1 can be used with a plurality of different types of refrigerating systems and are not limited solely to use in conjunction with freezing tunnels.

The foregoing and other various changes in form and details may be made without departing from the spirit and scope of the present invention. Consequently, it is intended that the appended claims be interpreted as including all such changes and modifications.

We claim:

1. A snow horn device for depositing a ribbon of solid $CO_2$ of substantially uniform depth comprising
   means for discharging liquid $CO_2$ to form a stream of solid and gaseous $CO_2$;
   a horn section having an inlet and outlet and a rectangular cross section of increasing area in a direction from said inlet to said outlet and having curved inner and outer wall sections;
   means disposed in the vicinity of said discharge means for deflecting said stream toward the interior surface of said outer wall section; and
   means for placing the interior of said horn section in communication with ambient atmosphere to induce said atmosphere into said horn interior whereby said solid $CO_2$ is spread substantially uniformly over said interior surface and said ribbon of solid $CO_2$ is formed upon discharge of solid $CO_2$ from said horn outlet.

2. The device defined in claim 1 wherein said means for discharging liquid $CO_2$ comprise means for limiting the pressure of said liquid $CO_2$ to about 200 psig or less and nozzle means coupled to said pressure limiting means for discharging said liquid $CO_2$.

3. The device defined in claim 2 additionally comprising a conduit connected to the inlet of said horn section with said liquid $CO_2$ discharging means being disposed in said conduit so as to emit liquid $CO_2$ therein in a generally upward direction such that the resulting solid and gaseous $CO_2$ stream travels generally upwardly through said horn section.

4. The device defined in claim 1 wherein the lower portion of said horn section is provided with an aperture defined therein to place the interior of said horn section in communication with said ambient atmosphere.

5. The device defined in claim 1 additionally comprising means for moving a surface relative to said device and in proximity to the outlet of said horn section such that said solid $CO_2$ discharged therefrom is deposited as said ribbon on said surface.

6. The device defined in claim 5 wherein said surface comprises a conveyor belt of a freezing tunnel.

7. The device defined in claim 5 wherein said surface comprises the interior surface of a refrigerating tumbler.

* * * * *